No. 656,700.  Patented Aug. 28, 1900.
L. W. PULLEN.
BATTERY BOX.
(Application filed Sept. 16, 1899.)

(No Model.)

Witnesses
Inventor
Leon W. Pullen
Attorney

UNITED STATES PATENT OFFICE.

LEON W. PULLEN, OF CAMDEN, NEW JERSEY, ASSIGNOR TO THE PULLEN BATTERY AND ELECTRICAL MANUFACTURING COMPANY, OF NEW JERSEY.

BATTERY-BOX.

SPECIFICATION forming part of Letters Patent No. 656,700, dated August 28, 1900.

Application filed September 16, 1899. Serial No. 730,668. (No model.)

*To all whom it may concern:*

Be it known that I, LEON W. PULLEN, of Camden, county of Camden, State of New Jersey, have invented an Improvement in Battery-Boxes, of which the following is a specification.

My invention has reference to electric-battery boxes; and it consists of certain improvements, which are fully set forth in the following specification and shown in the accompanying drawings, which form a part thereof.

The object of my invention is to provide a simple, cheap, durable, and efficient battery-box which shall have high insulating qualities.

In carrying out my invention I form the box structure of sheet-asbestos or asbestos composition rolled or formed into the proper box shape, with sides and bottom, and saturate and coat the same with asphaltum or other insulating compound unacted upon by acid electrolyte. In my preferred form I construct the walls of the box structure by wrapping thin asbestos previously saturated with the asphaltum and while the latter is in a sticky condition into the proper shape, so that the several layers making up the body of the walls adhere to each other to give the proper thickness and rigidity. Such box structure may either be left in a round condition or bent into a rectangular shape and may then have the bottom formed thereon or applied, said bottom being formed of asbestos saturated with asphaltum in a similar manner. In cases where the box is to be of small sectional area the asbestos sheets may be wrapped about a square or other-shaped mandrel either after or during the process of saturating it with asphaltum, and the bottom end of the asbestos paper may then be bent under to form the bottom of the box by overlapping several of the layers, in which case it will give several thicknesses for the bottom. The box so formed may be finally dipped in very fluid asphaltum and allowed to drain, so as to form a smooth outer surface, or it may be carefully treated by hand to impart the necessary finish. By this construction I secure the density and high insulating qualities of the asphaltum together with its imperviousness to moisture, thus forming a complete battery-box which is cheap to construct and difficult to break and at the same time having high insulating qualities.

My invention will be better understood by reference to the accompanying drawings, in which—

Figure 1:
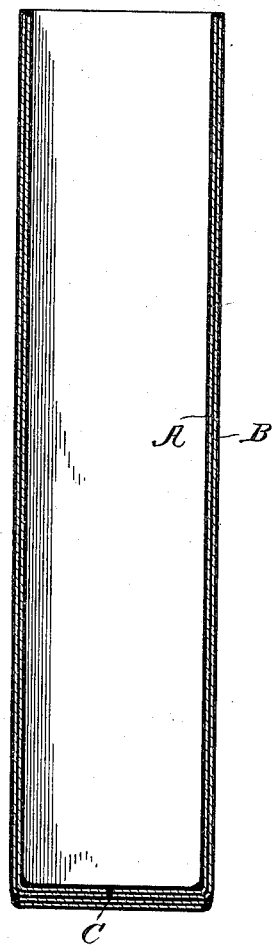
Figure 2:
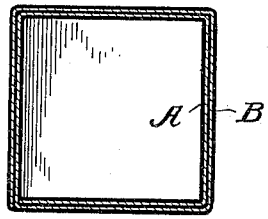
Figure 3:
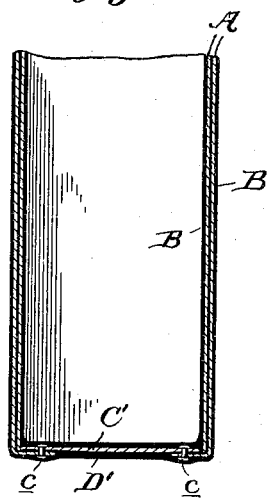

Figure 1 is a sectional elevation of a battery-box embodying my invention. Fig. 2 is a cross-sectional plan of same, and Fig. 3 is a sectional elevation of the bottom of a modification of my improvements.

A represents the sheet-asbestos, which is preferably made thin, so as to be easily wrapped upon itself to form a thick body of asbestos composed of several layers. This asbestos paper is saturated or impregnated with asphaltum or other highly-plastic insulating compound and wrapped into the requisite shape, so that the several layers of the asbestos are cemented together into a solid wall and all the interstices tightly and permanently closed with a high insulating compound. Both the inner and outer surfaces of the asbestos are in this manner coated with the insulating compound, which is indicated at B.

The bottom or lower end C of the box may be formed in any suitable manner; but where the box is small and rectangular lower extensions on the side walls may be lapped over each other, so as to make a bottom of several plies in thickness, as indicated in Fig. 1. This bottom is also coated with the asphaltum, so that it is liquid-tight, similarly to the side walls. In place of making the bottom as integral continuations of the side walls the bottom may be made in a separate piece D', as indicated in Fig. 3, which is held in place by the lower edges of the side walls being bent under, as at C', and to which the bottom is attached by the asphaltum. If desired, this connection may be reinforced by stitching or riveting, as indicated at c.

The particular shape of the box is immaterial, as it may be rectangular, square, or circular in plan to suit the particular desire or fancy. It is also evident that, broadly considered, my invention may be carried out by a heavy sheet of asbestos bent into the requisite shape in lieu of the one sheet wrapped upon itself, which is indicated in Fig. 2. Hence I do not limit myself to the minor details of construction.

Having now described by invention, what I claim as new, and desire to secure by Letters Patent, is as follows:

1. A battery-box consisting of a box-shaped body structure constructed of asbestos in a previously-formed sheet and impregnated and completely coated with an insulating compound of asphaltum.

2. A battery-box consisting of a box structure having its walls built up of a thin sheet of asbestos completely coated on both sides and impregnated with asphaltum or equivalent insulating and waterproof substance and wrapped upon itself in tubular form, whereby the body of the completed box is several plies in thickness and coated both on inside and outside with an insulating and waterproof compound.

3. As a new article of manufacture, a battery-box consisting of a tubular-shaped structure formed of an asbestos sheet and having the bottom slit and closed by overlapped extended lower ends, and the entire asbestos structure impregnated and coated with an insulating compound.

In testimony of which invention I have hereunto set my hand.

LEON W. PULLEN.

Witnesses:
R. M. HUNTER,
J. W. KENWORTHY.